Figure 1:
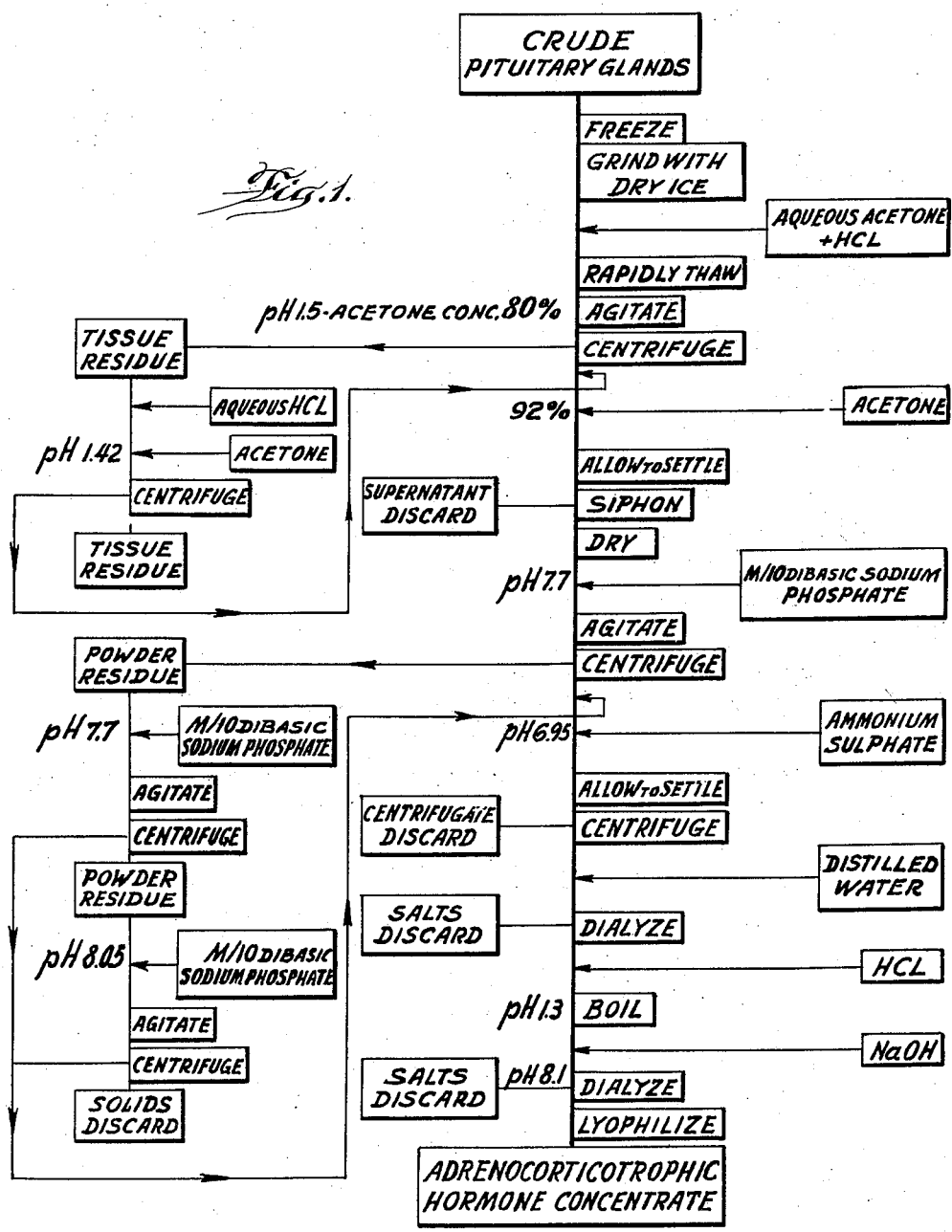

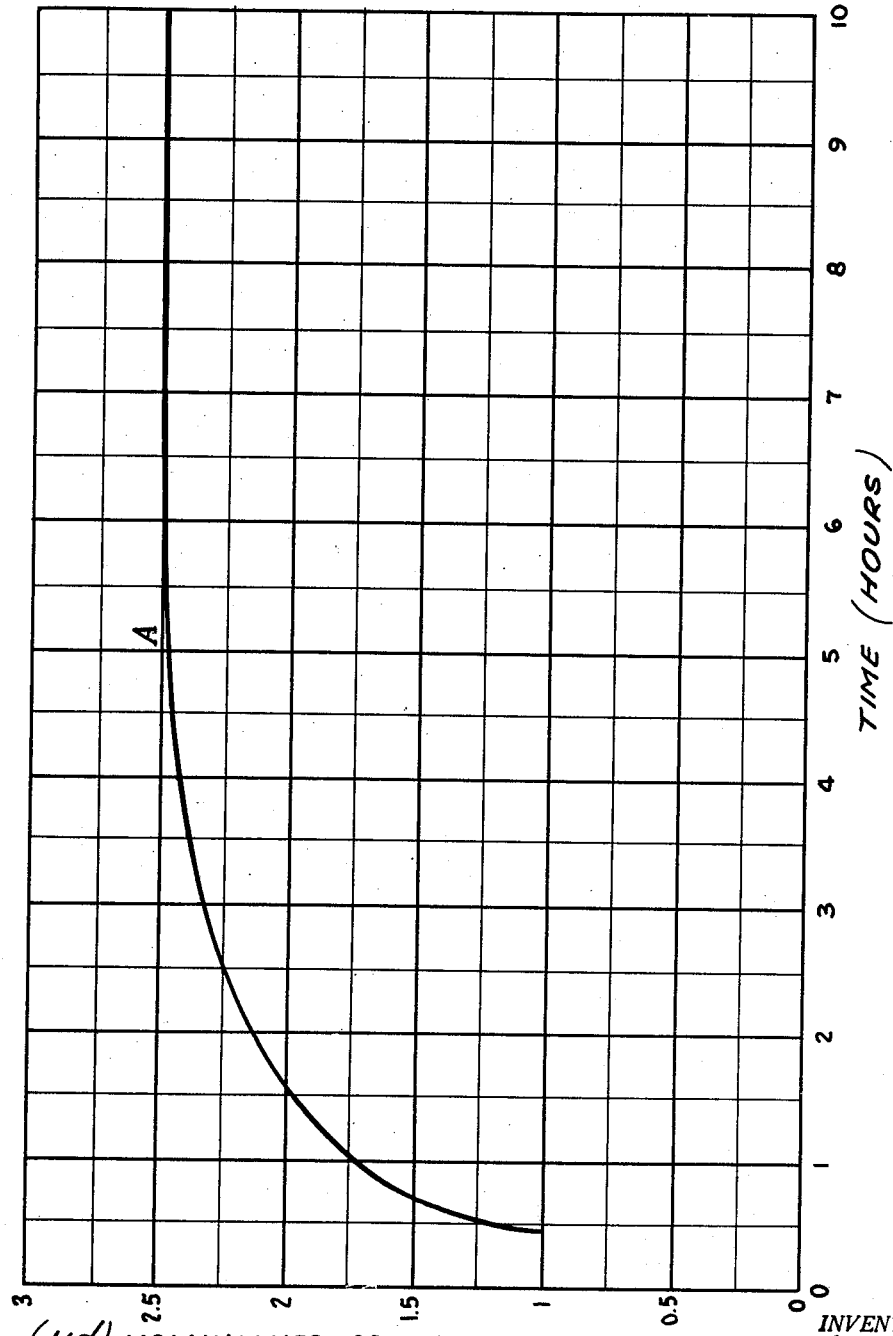

United States Patent Office 3,192,115
Patented June 29, 1965

3,192,115
PROCESS FOR PREPARING ADRENAL GLAND STIMULATING SUBSTANCE
Joseph D. Fisher, Chicago Heights, Ill., assignor, by mesne assignments, to Armour Pharmaceutical Company, a corporation of Delaware
Filed Jan. 30, 1957, Ser. No. 637,168
12 Claims. (Cl. 167—74)

This invention relates to an adrenal gland stimulating concentrate and to the preparation thereof. The invention is particularly useful in the preparation of a substance containing adrenocorticotrophic hormones and in a form for injection into human beings.

Considerable research has been carried on in connection with the extraction of animal pituitary glands and the literature discloses various methods that have been developed for such extractions and the character of the products obtained. As a result of such investigations, extracts were prepared which were suitable for injection into rats, guinea pigs, and similar animals.

In the processing of the pituitary glands, it is accepted procedure to freeze the glands after they have been removed and to keep them in frozen condition until they are to be extracted. At that time, the glands are allowed to thaw at room temperature over a period of 16 to 24 hours.

The potency of the hormone products obtained by such prior methods has been considerably less than standard, and generally in the nature of 50% of standard. The generally accepted standard is that which has been adopted by The Technical Advisory Committee to the Study Section for Metabolism and Endocrinology of the National Institutes of Health. This standard is approximately that of a physically-chemically pure hormone extracted from the pituitary glands and described by Sayers, Sayers and Woodbury in Endocrinology, volume 42, No. 5, May 1948, page 385. More recently the above-mentioned standard has been adopted as "International Standard." One milligram of the standard (also referred to as "LAIA") equals one International unit.

By reason of the low potency of the adrenocorticotrophic hormone products heretofore produced and because of their relatively high content of undesirable factors, such as posterior pituitary hormones, such products have not been satisfactory for the treatment of humans. In most cases, the product has contained excess salts and undesirable active principles which cannot be tolerated by the human being. This is further aggravated by the extremely low potency of the product.

In the extraction of animal pituitary glands, it is found that the extract contains, in addition to the adrenocorticotrophic hormones, certain undesirable factors which are tolerated only in very limited amounts by the human being. Principal among these are the posterior pituitary hormones which are generally referred to as "posterior pituitary factors" or "contaminants." These are proteinaceous material and consist mainly of oxytocic and vasopressor principles. Other anterior pituitary hormones are also found in the extract.

The posterior pituitary factors containing oxytocic and vasopressor activity, if present in the injected adrenocorticotrophic extract, have an adverse effect upon the abdominal muscles, giving the patient cramps, causing an increase in the blood pressure and a change in the amount of urine secreted, and creating also a serious metabolic unbalance in the system.

Since the pituitary glands of animals are extremely small and the content of the adrenocorticotrophic hormones therefore is very limited, it is of extreme importance that methods be developed for obtaining the utmost in yield of active substance from such glands and further, if possible, that the potency of the active substance be increased to as great an extent as possible. Any process which effectively eliminates the undesirable factors while at the same time increasing the potency of the active substance in the product obtained is of great value.

An object of the present invention is to provide an adrenal gland stimulating substance which is substantially free of active posterior pituitary factors and other materials not tolerable by the human system and suitable for injection for the treatment of forms of arthritis and other human pathological conditions. A further object is to provide an adrenal gland stimulating substance extracted from the pituitary gland and in a condition for injection into a human being for alleviating pathological conditions. A still further object is to provide methods of preparing the above and particularly for increasing the potency of the product. Yet another object is to provide a method for increasing the yield of the active substance while at the same time increasing its potency several fold over the potency of a physically-chemically pure hormone extracted from the pituitary glands. Other specific objects and advantages will appear as the specification proceeds.

I have discovered that when the frozen glands are subjected to quick thawing (preferably in from 20 minutes to one hour) rather than thawing over a 16 to 24 hour period, as in prior practice, that a very high increase in yield and potency is obtained. The dry ice gland mixture is preferably mixed with an organic solvent and quickly heated. Thus I have been able to obtain a crude product having a potency greater than standard.

In one phase of my invention, crude pituitary glands are extracted in an aqueous medium and the extract containing the active substance is separated from the meat. A precipitate containing the active material is recovered and the bulk of the contaminants separated by treatment with fractionating salts. The material is then subjected to hydrolysis and an inactive fraction of hydrolyzed fragmented material is separated from a fraction containing the active substance. The active fraction is then adjusted to a pH above 2.8, the excess salts being separated from the concentrate of the active principle.

One specific example of a method for carrying out the process is illustrated in the accompanying FIGURE I wherein the drawing is in the form of a flow sheet. However, other specific procedures may be employed within the description herein contained.

Another specific example of the process may be set out as follows: The crude pituitary glands, immediately after being removed, are frozen and kept in a frozen condition until they are ready to be processed. I then prefer to grind the glands with dry ice and then after adding a solution of an organic solvent, I thaw the frozen glands as rapidly as possible. The thawed glands are extracted in an aqueous medium which preferably contains acetone and at a pH of about 1.5. The meat may be separated from the filtrate in a centrifuge, or other suitable means. The filtrate may then be treated with additional acetone to bring the percentage of acetone to about 90%, at which point precipitation occurs. The precipitate is separated from the liquor, dissolved in water, and subsequently dried. The power thus obtained is extracted with 0.1 N solution of dibasic sodium phosphate and the material separated in a centrifuge. The supernatant material remaining after separation may be ½ saturated with ommonium sulphate to form a precipitate and again centrifuged. The precipitate may be dialyzed for three days in the cold to remove the ammonium sulphate. In this step, it is found that the active substance does not dialyze out.

The material is then subjected to hydrolysis and preferably to an acid hydrolysis with hydrochloric acid and at a pH below 1.5 and boiled for about two and one-half hours. The acid-treated hormone substance is brought to a pH above 4.0 and dialyzed to remove the excess salts.

The final product has a potency which is 220% of standard whereas hormone substances heretofore produced have a potency of approximately 50% of standard. The adrenocorticotrophic hormone concentrate thus produced has a pH above 2.8 and is dialyzable at a pH below 4.0. The concentrate is substantially free of active posterior pituitary factors and the hormone substance has a potency four times that of the harmone substances heretofore produced. The adrenocorticotrophic harmones in the concentrate are believed to consist to a large extent of micromolecule hormones which are less than half the size of physically-chemically pure adrenocorticotrophic hormone molecules extracted from pituitary glands, and the potency thereof appears to be greatly in excess of the potency of such physically-chemically pure hormones.

The bulk of the hormones in the concentrate appear to be micromolecular hormones, having a molecular weight of about 8,000.

The adrenocorticotrophic hormone concentrate produced as described above has been found to contain peptides having free amino and carboxyl groups. It is further characterized by its solubility in glacial acetic acid and phenol; by its relative insolubility in other organic solvents; by its greater stability under acid conditions than under alkali conditions; by its susceptibility to attack by proteolytic enzymes and petidases; and by its positive reaction to the Millon and xanthroproteic tests for tyrosine, the biuret test for peptide linkage, the ninhydrin test for free amino groups in the alpha position, the Sakaguchi test for guanidine groups, and the Hopkins-Gole and benzaldehyde tests for indole nuclei and tryptophane.

Considerable variations may be made in the process of producing the andrenal gland stimulating substance described. The extraction may be in an aqueous acid solution or in an aqueous solution of acetone, alcohol, or other organic solvents.

In the treatment of the precipitate from the extract, any suitable salts may be employed which provide a differential solubility in the salt concentrations. Monosodium phosphate, sodium chloride, ammonium sulphate, and other salts may be used if desired, but I prefer to employ dibasic sodium phosphate.

In the treatment with ammonium sulphate following the dibasic sodium phosphate step, it will be understood that other suitable salts may be substituted for the ammonium sulphate, as, for example, sodium chloride.

Instead of dialyzing the material described above in the specific example, it will be understood that the separation may be accomplished by other steps such as by pH precipitation, etc.

The hydrolysis step can be carried out at a temperature within the range of 50 to 110° C. and at a pH at least as low as that represented by the point on curve A of the accompanying FIGURE 2 which corresponds to the length of the period of time during which the hydrolysis is carried on. This drawing (FIG. 2) is in the form of a graph wherein the abscissa represents the length of the period of time in hours for the hydrolysis, and the ordinate represents the hydrogen ion concentration (pH) of the hydrolysis mixture. Consequently, it will be apparent that any point under curve A designates the conditions of time and pH at a temperature between 50 and 110° C. for the employment of my novel hydrolysis step. This hydrolysis step provides an excellent effect in inactivating posterior pituitary factors, while at the same time increasing the potency of the adrenocorticotrophic hormone. I prefer to employ acid hydrolysis and at a boiling temperature from 2 to 7 hours.

After hydrolysis, an alkali is preferably added to neutralize the acid, but if desired, an ion exchanger may be employed. Sodium hydroxide, potassium hydroxide, and ammonium hydroxide have been found very satisfactory for raising the pH to 4.0 and above.

In the final step, I prefer to dialyze the material and carry on the dialysis at a pH above 4.0. The salt materials may pass through the membrane and are separated while the harmone is recovered in the portion of the extract which does not pass through the membrane.

After the thawing of the frozen glands, I carry on the extraction step preferably at about room temperature. The remaining steps up to that of acid hydrolysis are preferably carried out in the cold (about 12° to −5° C.). The acid hydrolysis at boiling temperature is found to inactivate the posterior pituitary factors and the subsequent dialyzing steps eliminate the salts to the extent that they are not tolerated by the human system. The final product is substantially free of active posterior pituitary factors, and by "substantially free" I mean that such factors do not exist in an active state and in an amount which in the average dose would not be readily tolerated by human beings of all ages and sexes.

I prefer to thaw the ground mixture of Dry Ice and glands in less than an hour although improved results may be obtained by thawing the material within five hours, and the temperature may be raised from about −30° C. to about room temperature (25° C.). The heat may be applied by circulating a heating medium through coils in the vessel or by directing a heating medium such as steam against the vessel, etc.

The surprising increase in potency of the adrenocorticotrophic hormones may be the result of several steps in the process. The rapid thawing greatly increases the yield and potency of the crude powder. I believe that the acid hydrolysis step has an important bearing on the increase of such potency, and the preceding step of dialysis in the cold for about three days in combination with the acid hydrolysis appears to influence the increase in potency of the active substance in the new product.

Specific examples illustrating considerable variation in the steps of extraction, the preparation of the powder, the purification of the powder product, and the dialysis steps at different hydrogen ion concentrations, etc., may be set out as follows:

*Example 1*

500 grams of fresh hog pituitary glands were hashed in a hammer mill with Dry Ice and then extracted with hydrochloric acid solution at a pH of 1.5. The first extraction was at a ratio of 1 to 5 for two hours at room temperature. The supernatant liquid was centrifuged off and the residue resuspended and agitated with hydrochloric acid solution at a pH of 1.5 and a ratio of 1 to 4 for two hours at room temperature. The supernatant liquid was centrifuged off and the two recovered supernatant liquids were combined. They were precipitated into chilled acetone (−5° C.) to 80% acetone concentration. The precipitate formed was allowed to settle twenty-four hours at 0° C. The supernatant liquid was then siphoned off and poured into chilled acetone to 92% concentration. The precipitate formed was allowed to settle for twenty-four hours at 0° C.

The 80% acetone precipitate contained less than 3% adrenocorticotrophic activity. The 92% acetone precipitate contained 62% activity. The yield was 20 grams. The 92% precipitate was fractionated following the normal procedure described in the foregoing specification involving the use of dibasic phosphate and ammonium sulphate preparation, dialysis and partial hydrolysis. The purified fraction obtained had a potency of 97% of standard and was soluble in the ranges below pH 4.0 and above 7.5. The yield was 11.2 grams. The posterior pituitary factors or contamination consisted of .02 u./mg. oxytocin and .09 u./mg. vasopressor.

Example 2

500 grams of fresh hog pituitary glands were hashed in a hammer mill with Dry Ice and then extracted with hydrochloric acid solution at a pH of 1.5, ratio 1 to 5, for two hours at room temperature. The supernatant liquid was centrifuged off. The residue was resuspended and extracted with hydrochloric acid solution at a pH of 1.5, ratio 1 to 4, for two hours at room temperature. The supernatant liquid was centrifuged off and the two supernatant liquids were then combined. These were added to 9 volumes of ethyl alchol (chilled) and the pH adjusted from 1.5 to 4.7. The precipitate was allowed to settle for 24 hours. The potency of the preparation recovered was 48% of standard and the yield was 12% of the starting material. The preparation was fractionated by the usual procedure described in Example I, ending with a purified fraction having a potency of 120% of standard.

Example 3

500 grams of fresh hashed hog pituitary glands were extracted with 80% of acetone hydrochloric acid solution at a pH of 1.5 and a ratio of 1 to 6. The extraction was carried on for two hours at 0° C. The supernatant liquid was centrifuged off and the residue resuspended in 80% acetone hydrochloric acid solution (pH 1.5). The extraction was carried on for two hours at 0° C. and the supernatant liquid centrifuged off. The two supernatant liquids recovered were then combined and the pH shifted to 6.0 with 10% of sodium hydroxide. A precipitate formed and the material was allowed to settle for 24 hours at 0° C. The supernatant liquid was recovered and then made a 92% acetone concentration. A precipitate formed and the material was allowed to settle for 24 hours at 0° C. The precipitate formed at a pH of 6.0 contained less than 4% adrenocorticotrophic activity. The precipitate at 92% acetone concentration contained an adrenocorticotrophic activity equivalent to 54% of standard. The 92% acetone precipitate was fractionated following the procedure described in Example 1. The potency of the final product was 116% of standard. The recovery was 14% of the starting material.

Example 4

As a starting material, 500 grams of fresh hog pituitary glands were hashed in a hammer mill with Dry Ice. The ratio of the extraction media was 1 to 6. The pH of the extraction media was 9.0. The extraction was carried on for two hours at 0° C. The supernatant liquid was then centrifuged off and the residue resuspended. The residue was extracted with sodium hydroxide at a pH of 9.0 for two hours, the ratio being 1 to 5. The supernatant liquid was then centrifuged off and the two supernatant liquids recovered were combined. They were precipitated with 80% chilled acetone (−5° C.) and the precipitate allowed to settle 24 hours. The supernatant liquid was recovered and made 92% acetone. A precipitate formed and the material was allowed to settle for 24 hours at 0° C. The precipitate was then recovered and was found equivalent to 15% of the starting material, containing adrenocorticotrophic activity equivalent to 43% of standard. This material was fractionated in the usual manner, as described in Example 1, and resulted in a preparation containing adrenocorticotrophic activity equivalent to 140% of standard. The yield was 8% of the starting material.

Example 5

As a starting material, 500 grams of fresh hog pituitary glands were hashed in a hammer mill with Dry Ice and then extracted with ethyl alcohol at a concentration of 60%, pH 1.5, hydrochloric acid solution. The extraction ratio was 1 to 5 and extraction was carried on for two hours at room temperature. The supernatant liquid was centrifuged off and the residue resuspended in 60% alcohol, hydrochloric acid solution, pH 1.5. The extraction was carried on for two hours at 0° C. and the ratio was 1 to 4. The supernatant liquid was centrifuged off and the two supernatant liquids recovered were then combined and made 92% alcohol. The pH was then shifted from 1.5 to 4.7 and a precipitate formed. The material was allowed to settle for 24 hours at 0° C. The precipitate recovered had an adrenocorticotrophic potency of 45% of standard. The recovery was 14% of the starting material. This fraction was extracted in the usual manner described in Example 1 and resulted in a preparation containing 150% of standard. The recovery amount was 7% of the starting material.

Example 6

Crude adrenocorticotrophic concentrate was prepared as follows: 50 pounds of frozen whole hog pituitary glands were finely ground with Dry Ice in a hammer mill and passed through a No. 3 screen. The material was agitated with 22.7 liters of 100% acetone to which had been added 954 cc. of concentrated hydrochloric acid. The mixture was warmed to room temperature by warming the tank containing the mixture with a steam hose while agitating for 20 minutes. The material was brought to a pH of 1.5, 44 liters of 100% acetone being added and the final concentration of acetone being 78%. The mixture was now agitated for one hour at room temperature and the suspension then allowed to settle for 15 minutes. The supernatant liquid was siphoned into a blow tank and then centrifuged through a Sharples separator. The volume of the centrifugate was 58 liters having a pH of 1.5 and a specific gravity of 0.868 at 22° C. The residue was resuspended with 9 liters of water to which had been added 40 cc. of concentrated hydrochloric acid, giving a pH of 1.42. 32.2 liters of 100% acetone were now added and the mixture agitated for one hour. The entire mixture was then centrifuged in the Sharples centrifuge and then recentrifuged. The volume of the centrifugate was 38 liters. The pH was 1.5 and the specific gravity was 0.869. The volume of the combined centrifugates was 96 liters having a specific gravity of 0.869 at a pH of 1.5. The combined centrifugates were poured into 200 liters of chilled acetone for precipitation, the final concentration being 92% acetone. The supernatant liquid was siphoned off after the precipitate was allowed to settle for two days at 5° C. The precipitate was then filtered through a Buchner funnel and dried in a vacuum oven. The precipitate tank was washed with two liters of distilled water and the water solution dried by lyophilization. The weight of precipitated powder was 525 grams and its potency was 72% of standard.

Example 7

The powder prepared as described in Example 6 was purified according to the following procedure: 847.6 grams of the powder were extracted in 16.9 liters M/10 dibasic sodium phosphate, the ratio in the first extraction being 1 to 20. The material was agitated for 16 hours at 5° C. and centrifuged in a Sharples separator. The pH was 7.7 and the volume recovered was 16 liters.

The second extraction ratio was 1 to 12, the residue from the first extraction being added to 10.2 liters of M/10 dibasic sodium phosphate. This was agitated for 16 hours at 5° C. and centrifuged in a Sharples separator. The pH was 7.7 and the volume recovered, 10 liters.

The third extraction ratio was 1 to 12, the residue from the second extraction being added to 10.2 liters of M/10 dibasic sodium phosphate. This was agitated for 16 hours at 5° C. and then centrifuged in a Sharples separator. The pH was 8.05 and the volume recovered 9.3 liters. To the combined extracts (volume 35.3 liters) at a pH of 6.95 were added 24.6 pounds of ammonium sulphate (to 50% saturation). The precipitate was allowed to settle for 24 hours at −5° C. and the precipitate was then centrifuged in a Sharples separator. The precipitate was then suspended in 3 liters of distilled water and placed into Visking casings 30/32" and dialyzed 3 days against 150 gallons of distilled water (50 gallons each 24 hours) with agitation. The volume of dialyzed adrenocorticotrophic material was 4.4 liters having a final pH of 5.9. This pH was adjusted to 1.3 with 110 ml. 10% hydrochloric acid (by volume) and boiled at 100° C. for 2½ hours. The solution was cooled and the pH adjusted to 8.1 with 125 ml. 10% NaOH. The solution at the pH of 8.1 was then placed in Visking casings and dialyzed for 24 hours against 50 gallons of distilled water with agitation. The pH of the dialyzed solution was 7.7 and it was lyophilized to dry powder. The yield was 200 grams and the potency 230% of standard. The posterior pituitary contamination present was oxytocin .02 u./mg. and vasopressor .06 u./mg.

*Example 8*

230 grams of powder prepared as described in Example 6 was found to have a potency of adrenocorticotrophic activity of 10% of standard. The extraction was with 0.1 molar monobasic sodium phosphate, the ratio of solvent to solute being 1 to 20 and the pH being 3.0. The extraction was continued for 12 hours at 50° C. and the supernatant liquid centrifuged off. The residue was extracted with 0.1 molar monobasic sodium phosphate at a ratio of solvent to solute of 1 to 12 and at a pH of 3.0. The extraction was for 12 hours at a pH of 3.0 at 50° C. and the supernatant liquid was centrifuged off.

The residue was extracted with 0.1 molar monobasic sodium phosphate, the ratio of solvent to solute being 1 to 12 and the pH being 3.0. The extraction was for 12 hours at a pH of 3.0 and at 50° C. The supernatant liquid was centrifuged off and the supernatants from the above were combined. Ammonium sulphate was added to ½ saturation and the precipitate formed was allowed to settle for 24 hours at 0° C. The precipitate was recovered and dialyzed in Visking casings (30/32") for 72 hours against distilled water (50 gallons) for 24 hours. The dialyzed material was recovered and the pH adjusted to 1.3 with 10% HCl and boiled for 2.5 hours. It was then cooled and neutralized with 10% sodium hydroxide. The material was then placed in Visking cellulose casings and dialyzed for 24 hours against distilled water. The dialyzed material was recovered and lyophilized to dry powder.

Recovery—35 grams
Potency—130% standard
Posterior pituitary contamination—0.02 u./mg. oxytocin, 0.06 u./mg. vasopressor
Anterior pituitary contamination—negligible for growth—gonadotrophin, prolactin and thyrotrophin

*Example 9*

The following tests illustrate the significance of the hydrogen ion concentration at which the adrenocorticotrophic hormone media is adjusted after partial hydrolysis with hydrochloric acid solution at a pH of 1.5 and before the dialysis step. After a 2% protein concentration thereof had been boiled at a pH of 1.5 for 2.5 hours, portions thereof were dialyzed under the following different conditions:

(a) 100 cc. brought up from pH 1.5 to 3.0—dialyzed 24 hours at 0° C. against 1000 cc. distilled water.
(b) 100 cc. pH from 1.5 to 4.0—dialyzed 24 hours at 0° C. against 1000 cc. distilled water.
(c) 100 cc. pH from 1.5 to 5.0—dialyzed 25 hours at 0° C. against 1000 cc. distilled water.
(d) 100 cc. pH from 1.5 to 6.0—dialyzed against distilled water, 1000 cc. for 24 hours at 0° C.
(e) 100 cc. pH from 1.5 to 7.0—dialyzed as above.
(f) 100 cc. pH from 1.5 to 8.0—dialyzed as above.
(g) 100 cc. pH from 1.5 to 10.0—dialyzed as above.

The results were as follows:

| pH | | | | | | |
|---|---|---|---|---|---|---|
| 3.0 | 4.0 | 5.0 | 6.0 | 7.0 | 8.0 | 10.0 |
| Recovery in grams (remaining in dialysis bags) | | | | | | |
| (a) | (b) | (c) | (d) | (e) | (f) | (g) |
| 0.18 | 0.29 | 1.6 | 1.72 | 1.5 | 1.63 | 1.4 |
| Potency of fractions, percent | | | | | | |
| (a) | (b) | (c) | (d) | (e) | (f) | (g) |
| 132 | 146 | 139 | 126 | 131 | 142 | 129 |
| Recovery in grams (outside bags in dialysate) | | | | | | |
| (a) | (b) | (c) | (d) | (e) | (f) | (g) |
| 1.5 | 1.2 | 0.2 | 0.16 | 0.13 | 0.10 | 0.13 |
| Potency of fractions, percent | | | | | | |
| (a) | (b) | (c) | (d) | (e) | (f) | (g) |
| 128 | 122 | 6 | 7.2 | 5.9 | 8.0 | 6.5 |

The following example or series of tests illustrates the value of rapid thawing of the frozen pituitary gland tissue and the marked increase in yield and potency as a result of such rapid thawing.

*Example 10*

As a starting material, 1000 grams of the pituitary gland tissue frozen in Dry Ice was divided into two 500 gram parts, the first part being indicated as part A, and the second as part B.

The 500 grams (indicated as part A) were suspended into 60% acetone hydrochloric acid solution at a pH of 1.5 and thawed rapidly by directing steam from a steam hose against the vessel exterior, the temperatures of the material being raised from −20° C. to room temperature (21° C.) in 30 minutes, the material being agitated. Acetone was then added to a concentration of 80% and the mixture was agitated for 2 hours at room temperature, the supernatant liquid being centrifuged off. The residue was resuspended in 80% acetone-hydrochloric acid mixture and agitated for 2 hours at room temperature. The supernatant liquid was centrifuged off. The supernatant liquids thus recovered were combined and poured into chilled acetone (−5° C.) to 92% concentration. The precipitate formed was allowed to settle for 24 hours at 0° C. The precipitate was recovered and lyophilized to dry powder. The yield was 16 grams and the adrenocorticotropic potency was 100% of standard.

The 500 grams of part B were allowed to thaw for 16 hours at room temperature. The material was then suspended in 80% acetone-hydrochloric acid mixture in a ratio of 1 to 4 and agitated for 2 hours at room temperature. The supernatant liquid was centrifuged off and the residue resuspended in 80% acetone-hydrochloric acid solution in a ratio of 1 to 3. The material was agitated for 2 hours at room temperature and the supernatant liquid centrifuged off. The supernatant liquid portions were then combined and poured into chilled acetone to 92% concentration. The precipitate which formed was allowed to settle 24 hours at 0° C. The precipitate was recovered and lyophilized to dry powder stage. The yield was 9 grams and the adrenocorticotrophic potency was 19.7+6.3% of standard.

*Example 11*

As a starting material, 100 grams of pituitary gland tissue frozen in Dry Ice was suspended into 60% acetone-hydrochloric acid solution at a pH of 1.5 and thawed rapidly by directing steam from a steam hose against the exterior of a metal vessel containing the glands. The temperature was raised from −30° C. to 25° C. in about 30 minutes, the material being agitated. Acetone was then added to a concentration of 80% and the mixture was agitated for two hours at room temperature, the supernatant liquid being centrifuged off. The residue was resuspended in 80% acetone-hydrochloric acid mixture and agitated for two hours at room temperature. The supernatant liquid was centrifuged off. The supernatant liquids thus recovered were combined and poured into chilled acetone (−5° C.) to 92% concentration. The precipitate formed was allowed to settle for 24 hours at 0° C. The precipitate was recovered and lyophilized to dry powder stage. The yield was 32 grams and the adrenocorticotrophic potency was 111% of standard.

Tests, similar to those set out in the foregoing examples, have been carried out upon hog, beef, lamb, and other animal pituitary glands, and including also pituitary glands of whales. The process was carried out through the various steps described on fresh-ground hog whole pituitary glands, fresh ground hog anterior pituitary glands, acetone dried hog whole pituitary glands, lyophilized frozen hog whole pituitary glands brought to a dry stage, fresh ground beef anterior pituitary glands, fresh ground lamb whole pituitary glands, fresh ground sheep whole pituitary glands, acetic acid extracted hog whole pituitary glands left unneutralized and dried (acetic acid being used to extract posterior pituitary constituents—oxytocin and vasopressor) whale pituitary glands including whole and anterior glands, acetone dried sheep anterior pituitary glands, etc.

In a further embodiment of the invention, I have discovered that for most purposes the treatment with fractionating salts can be omitted and a potent product obtained by lowering the pH of the acetone precipitate or powder in an equeous medium to about pH 1.2 to 1.5, boiling the material and then, after adjusting the pH to about 7.5 to 8.5, dialyzing the material to remove the bulk of the contaminants. By the above described operation, the bulk of the contaminants is removed in the dialyzing operation while the active material does not pass through the membrane. At the same time, the final product which may be recovered by drying the non-dialyzed material (as by lyophilizing) is recovered in a more potent form, the increase in potency being generally in the nature of a three-fold or more increase.

To describe this embodiment of the invention in more detail, crude pituitary glands are extracted in an aqueous medium, and the extract containing the active substance is separated from the meat material in a centrifuge or other suitable means. The aqueous medium employed in the extraction preferably contains acetone and at a pH of about 1.5. After the centrifuging step, the filtrate may be treated with additional acetone to bring the percentage of acetone to about 90%, at which point precipitation occurs. The precipitate is separated from the liquor, dissolved in water, and subsequently dried. This dry powder is generally referred to as the "acetone powder," and it contains the active hormone material. I prefer to mix the powder with distilled water to form a concentration of 2 to 3%, adding sufficient acid, such as HCl, etc., to bring the pH to about 1.2 to 1.5. I then boil (refluxing or autoclaving) for a period of about three hours. In the autoclaving operation, the pressure is about three pounds and the temperature usually about 102° C. The material is then cooled, and the pH adjusted with sodium hydroxide, etc. to 5.0 to 8.5. At the above pH the mixture is dialyzed against distilled water and the material, which remains undialyzable, is dried, as for example, by lyophilizing.

The final product has at least a three-fold increase in potency over the starting material and is substantially free of active posterior pituitary factors and antigenecity. The yield of recoverable solids is in the range of about 50 to 70% of the starting material.

By the above described process, I am able to recover a large percentage of the active material from the glandular material extracted, while at the same time, the active substance is retained in highly potent form and substantially free of the undesirable factors.

Specific examples illustrating this embodiment of the invention may be set out as follows:

Example 1

289.2 grams of hog adrenocorticotrophic hormone substance obtained by the extraction of hog pituitary glands in an aqueous media containing acetone, the substance being later precipitated by additional acetone, as described above, were suspended in 14 liters of distilled water, the pH being adjusted to 1.1 with 200 ml. 4 N HCl. This solution was refluxed for three hours at 100° C. and then cooled to about room temperature. The pH was then adjusted from 1.5 to 7.95 with 270 ml. 5 N NaOH. The material was dialyzed against distilled water (50 liters) at 32° F. for twenty-four hours. The dialysis water was changed, and the dialysis continued for an additional twenty-four hours. Negligible amounts of active adrenocorticotrophin dialyzes out at the above-mentioned pH, leaving the bulk of the active fraction in the bags, the contents of which were shell-frozen and lyophilized. 200 grams were recovered, having a potency of 160% of standard as compared with the starting material which had a potency of 40% of standard. The recovery in solids was 71%.

Example 2

100 grams of adrenocorticotrophic substance obtained by the extraction of beef pituitary glands through the use of an aqueous acetone medium, the active substance being precipitated by the addition of acetone, as above described, were suspended in 5 liters of distilled water, the pH being adjusted to 1.25 with 110 ml. 4 N HCl. The material was autoclaved at 100° C. for three hours with 2% steam pressure. The material was then cooled to 25° C., and the pH adjusted from 1.4 to 8.1 with 135 ml. 5 N NaOH. The material was then dialyzed against 20 liters of distilled water at 32° C. for twenty-four hours. The dialysis water was changed, and the dialysis continued for an additional twenty-four hours. The undialyzed material in the cellophane bag was shell-frozen and lyophilized. 63 grams were recovered, and the potency was 79% as compared with the starting potency of 40%.

Example 3

100 grams of adrenocorticotrophic substance obtained by the extraction of hog pituitary glands and precipitated by the use of acetone, as described above, were suspended in 5 liters of distilled water, the pH being adjusted to 1.3 with 75 ml. 4 N HCl. The material was refluxed for three hours at 100° C. and then cooled to 23° C. The pH was then adjusted to 7.9 with 5 N NaOH and dialyzed against distilled water (50 liters) for twenty-four hours. The dialysis water was changed, and the material was again dialyzed for twenty-four hours in 50 liters of distilled water. The cellophane bag contents were then frozen and lyophilized. The recovery was 28.4 grams and had a potency of 160% of standard.

At the pH of the isoelectric point of the adrenocorticotrophic hormone, a change takes place which decreases the dialyzability of the active hormone substance, and I prefer, therefore, to dialyze within the pH range of 5.0 to 8.5.

While the foregoing process has been described in connection with an acid acetone powder obtained by precipitating the active substance from an acetone aqueous extract, it will be understood that the process may be effectively carried on with any starting material containing the adrenocorticotrophic substance.

My adrenocorticotrophic hormone product, produced by any of the foregoing methods, has a posterior pituitary contamination at least as low as 0.08 unit of vasopressin activity per International unit of adrenocorticotrophin potency. Further, it is preferred that this product have an oxytocin contamination at least as low as 0.05 unit per International unit of adrenocorticotrophin potency.

The vasopressin activity of my adrenocorticotrophic hormone product is determined according to the method recognized by the United States Pharmacopeia as compared with the standard preparation established thereby. The oxytocin activity of this product is determined by the uterine strip method which is also recognized by the United States Pharmacopeia. Another method which is suitably correlated with that of the United State Pharmacopeia analysis is the procedure of Coon as modified by R. E. Thompson, involving the analysis of rooster blood pressure.

This application is a continuation-in-part of my copending applications Serial No. 194,718, filed November 8, 1950, and Serial No. 435,451, filed June 9, 1954, both of which are continuations-in-part of my application Serial No. 122,588, filed October 20, 1949, all now abandoned.

While in the foregoing description, I have set out specific steps of the process in considerable detail for the purpose of illustrating embodiments of the invention, it will be understood that such details may be varied widely by those skilled in the art without departing from the spirit of my invention.

I claim:

1. In a process for preparing an adrenal gland stimulating substance in which pituitary glands are extracted with a solvent for said substance to provide a solution thereof, and in which material containing the major portion of said substance is precipitated from said solution, the step of acid hydrolyzing the precipitated material at a pH at least as low as 2.5 and at a temperature within the range of 50 to 110° C. for a period of time less than 7 hours but at least as long as 30 minutes, whereby an adrenal gland stimulating substance is provided having a potency at least equal to that of LAIA.

2. In a process for preparing an adrenal gland stimulating substance in which pituitary glands are extracted with a solvent for said substance to provide a solution thereof, and in which material containing the major portion of said substance is precipitated from said solution, the step of acid hydrolyzing the precipitated material at a temperature between 50 and 110° C. for a period of time less than 7 hours and at a pH at least as low as that represented by the point on curve A of FIGURE 2 which corresponds to the length of the period of time during which the hydrolysis is carried on, whereby an adrenal gland stimulating substance is provided having a potency at least equal to that of LAIA.

3. In a process for preparing an adrenal gland stimulating substance in which pituitary glands are extracted with a solvent for said substance to provide a solution thereof, and in which material containing the major portion of said substance is precipitated from said solution, the steps of acidifying the precipitated material to a pH at least as low as 2.5, and hydrolyzing said material at a temperature between 50 and 110° C. for a period of time less than 7 hours but at least as long as that represented by the point on curve A of FIGURE 2 which corresponds to the particular pH employed, whereby an adrenal gland stimulating substance is provided having a potency at least equal to that of LAIA.

4. In a process for preparing an adrenal gland stimulating substance in which pituitary glands are extracted with a solvent for said substance to provide a solution thereof, and in which material containing the major portion of said substance is precipitated from said solution, the steps of acidifying the precipitated material, hydrolyzing the acidified material at a temperature within the range of 50 to 110° C. for a period of time less than 7 hours but at least as long as that represented by the point on curve A of FIGURE 2 which corresponds to the paritcular pH employed, and separating the adrenal gland stimulating substance from the hydrolyzed material, said substance having a potency at least equal to that of LAIA.

5. In a process for preparing an adrenal gland stimulating substance in which pituitary glands are extracted with a solvent for said substance to provide a solution thereof, and in which material containing the major portion of said substance is precipitated from said solution, the steps of acid hydrolyzing the precipitated material at a temperature between 50 and 110° C. for a period of time less than 7 hours and at a pH at least as low as that represented by the point on curve A which corresponds to the length of the period of time during which the hydrolysis is carried on, and dialyzing the hydrolysis product at a pH at least above 4.0, whereby an adrenal gland stimulating substance is provided having a potency at least equal to that of LAIA.

6. In a process for preparing an adrenal gland stimulating substance from pituitary glands in which the glands are extracted with a solvent for the unhydrolyzed stimulating substance and said unhydrolyzed active substance concentrated, the steps of acidifying the concentrate to bring the pH thereof to about 1.5, and heating the acidified precipitate to approximately 100° C. for about two and one-half hours, and finally separating the active substance from the hydrolyzed material.

7. In a process for preparing an adrenal gland stimulating substance from pituitary glands in which pituitary glands are extracted with a solvent for the unhydrolyzed stimulating substance and a concentrate of the unhydrolyzed substance obtained, the steps of acidifying a solution of the concentrate to a pH of about 1.5, heating the solution to about 100° C. for a period of two to seven hours to hydrolyze the concentrated material, and separating the active stimulating substance from said hydrolyzed material.

8. In a process for preparing an adrenal gland stimulating substance from pituitary glands in which the glands are extracted to form a solution of said active stimulating substance and said substance concentrated, the steps of acidifying the concentrate material to a pH of about 1.5, heating the solution to approximately 100° C. from about two to seven hours, and dialyzing the material at a pH above 4.0.

9. In a process for preparing an adrenal gland stimulating substance from pituitary glands in which the glands are extracted to form a solution of such active stimulating substance and in which the major portion of the active substance is precipitated from the solution, the steps of acidifying the precipitate and hydrolyzing the solution of the precipitate at least to the extent of boiling the same at a pH of 1.5 from two to seven hours to hydrolyze the material, and separating the bulk of the active substance from the hydrolyzed material.

10. In a process for preparing an adrenal gland stimulating substance, in which process pituitary glands are extracted to form an aqueous acetine extract of the active substance and an acetone precipitate of the active substance formed, the step of boiling the acetone precipitate at a pH of about 1.2 to 1.5 for about three hours to free the same of active posterior pituitary contaminants and to increase the potency of the substance.

11. In a process for preparing an adrenal gland stimulating substance, in which process pituitary glands are extracted to form an aqueous acetone extract of the active substance and an acetone precipitate of the active substance formed, the steps of acidifying the acetone precipitate to bring the pH thereof to about 1.2 to 1.5, boiling the acidified precipitate for about three hours, adjusting the pH to about 5.0 to 8.5, and dialyzing the material.

12. In a process for preparing an adrenal gland stimulating substance from pituitary glands in which the glands are extracted with aqueous acetone to form a solution of the active stimulating substance and in which acetone is added to form an acetone precipitate of the active substance, the steps of acidifying the acetone precipitate, boiling the precipitate at a pH of about 1.2 to 1.5 for about three hours, and separating the bulk of the active substance from the hydrolyzed material.

References Cited by the Examiner

UNITED STATES PATENTS 2,844,511   7/58   Brink et al. _____ 167—74

OTHER REFERENCES

Collip: Symposia Quant. Biol., vol. 5, 1937, page 210, 211–212.

Smorodintsev: Literature Search on the Preservation of Food by Freezing (Weil and Stern), June 1946, page 225 (Article 1417).

Li in "The Hormones," by Pincus, 1948, pages 667–673.

JULIAN S. LEVITT, *Primary Examiner.*

W. B. KNIGHT, M. O. WOLK, *Examiners.*